UNITED STATES PATENT OFFICE.

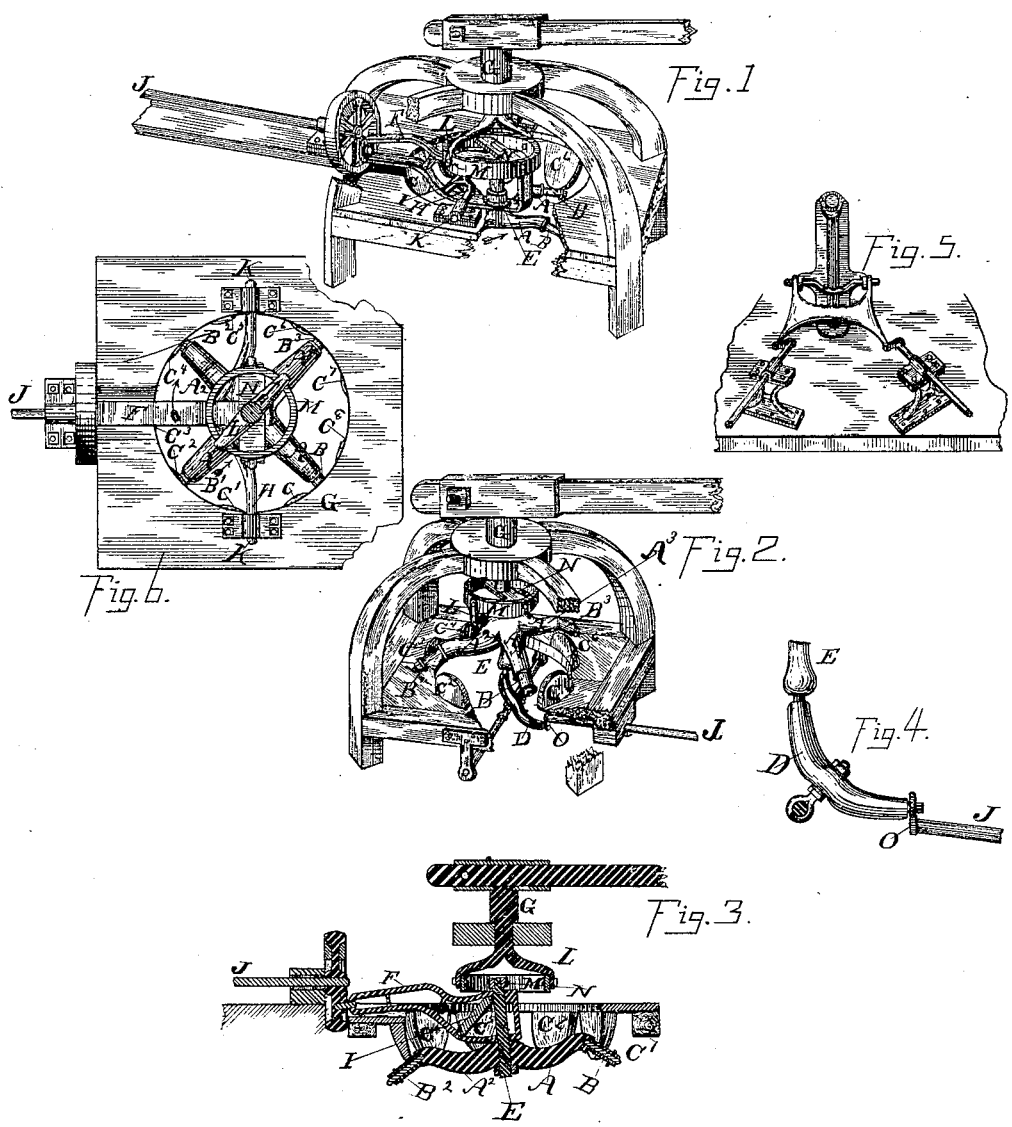

SAMUEL DEVISME, OF LOS ANGELES, CALIFORNIA.

MECHANICAL MOVEMENT.

SPECIFICATION forming part of Letters Patent No. 344,357, dated June 29, 1886.

Application filed November 27, 1885. Serial No. 184,011. (No model.)

*To all whom it may concern:*

Be it known that I, SAMUEL DEVISME, a citizen of France, and a resident of the city and county of Los Angeles, State of California, have invented a new and useful Improvement in Mechanical Movements, of which the following is a specification.

My invention relates to that class of machines adapted to transmit motion from one rotary shaft to another, increasing or diminishing the number of revolutions and changing the direction of the line of motion.

The object of my invention is to devise a machine which may be constructed by mechanics of ordinary skill, and which will be adapted for use as a horse-power.

My machine is also adapted for use in wind-mills and power-machines of all kinds where it is desirable to increase or reduce the number of revolutions.

A further object of my invention is to avoid the friction consequent upon the use of a train of gearing where it is desired to greatly increase or diminish the number of revolutions; also, to avoid the expense of the large cog-wheel necessary to give a desirable increase in the number of revolutions.

I accomplish these objects by means of the device described herein, and illustrated in the accompanying drawings, in which—

Fig. 1 is a perspective view of one form of machine embodying my invention. Fig. 2 is a perspective view of another form of machine embodying my invention. Fig. 3 is a vertical mid-section of the form shown in Fig. 1. Fig. 4 is a view of the transmitter shown in Fig. 2. Fig. 5 is a modified form of such transmitter. Fig. 6 is a plan view of the form of machine shown in Fig. 1.

The principle of construction is as follows: A shaft, E, having a number of arms of equal length set at equal distances apart, substantially as $A\ A'\ A^2\ A^3$, is swung from a gimbal or mounted in such other manner as to permit it to swing freely in any direction. Upon the ends of these arms are mounted friction-rollers $B\ B'\ B^2\ B^3$. The axes of these rollers converge to a point at the center of suspension of the shaft which supports the arms—that is to say, in case the shaft which supports the arms is suspended by a gimbal, as shown in the drawings, the axes of the rollers converge to the point in the gimbal where the center lines of its pivots intersect, which is the point from which the shaft is suspended. Cogs $C\ C'\ C^2$, &c., are mounted in the circle described by the rollers when the arms are revolved, and the ends thereof project across the path in which the rollers would travel if the arms were to be revolved in a horizontal plane.

In constructing a machine the arms may be mounted, as shown in Fig. 1, so that the rollers will come into contact with the inner face of the cogs; or, as shown in Fig. 2, they may be mounted so that the rollers will come into contact with the outer face—that is to say, in Fig. 1, which is the form I prefer, as it can be made to occupy much less space than the form shown in Fig. 2, the arms are within the circular rack formed by the cogs, and represent a wheel smaller in diameter than the rack, while in Fig. 2 the rollers operate upon the outer side of the rack formed by the cogs, and represent a wheel of greater diameter than the rack.

The relative difference in size of the wheel represented by the arms when they work within the rack, as shown in Fig. 1, will be such as to give the rack one more cog than the wheel represented by the arms, and in case the arms work upon the outer side of the rack, as shown in Fig. 2, the number of cogs in the wheel represented by the arms will exceed by one the number of cogs in the rack, so that the number of revolutions of J given in Fig. 1 by one revolution of the shaft G will be one less than the number of cogs, while, where the rollers operate upon the outer side of the rack the number of revolutions will be one greater than the number of cogs, so that in Fig. 1, where there are nine cogs, one revolution of G will give but eight revolutions of J, while in Fig. 2, which has but seven cogs, one revolution of G will give eight revolutions of J.

In constructing the machine it will be found necessary in arranging the number of cogs and arms to observe that if the rollers are mounted within the rack, as shown in Fig. 1, the number of cogs must exceed by one the number of arms or some multiple thereof. When the rollers operate upon the outer side of the rack, as shown in Fig. 2, the number of cogs must be one less than the number of arms or some multiple thereof, otherwise the arms will not be in proper relation to the cogs, and will not work smoothly. If the above rule is followed, the difference of the one cog will be equally distributed among all the rollers and the machine will not bind. By arranging the number of cogs and arms in this manner it will be found that the arms will be made to assume a relative position to the cogs, substantially such as is shown in the drawings—that is to say, referring to Fig. 6 for illustration, in which form the arms are mounted inside the rack, when the roller B first comes into contact with a cog, C, the roller B' will have partially ascended the second tooth therefrom, while the roller B² will have passed the center of its cog, and the roller B³ will be in a space between two cogs. The gimbal L M N is suspended from a rotary shaft, G, and revolves as the shaft is turned, thus revolving the suspended shaft E and the arms mounted thereon. As the arms revolve, the rollers mounted thereon come into contact with the cogs in succession with the following result, referring to Figs. 1 and 6 for illustration: The arms are supposed to be revolving in the direction shown by the curved arrow, and B has just come into contact with the cog C, which checks the forward motion of the arm and tilts the frame and its suspending shaft E in the direction shown by the straight arrow, thus tending to elevate the arm A and lower A² and A³. As the roller B' on A' is ascending the inclined crown of the tooth or cog C² at this moment, it also assists in swinging the frame in the direction indicated by the arrow, and as the roller B² is descending the inclined crown of the cog C⁴, and the roller B³ is midway between the cogs C⁶ and C⁷, the shaft E is left free to be swung in the direction shown by the straight arrow. As the shaft D continues to rotate, the several rollers change their positions relative to the several cogs, so that B³ comes into contact with C⁷, B ascends C, B' descends C², and B² passes between the cogs C⁴ and C⁵. Each time a roller strikes a cog it tilts the shaft E, as above described, and the motion imparted to the shaft E by the action of the rollers upon the several cogs is such as to cause the axis of the shaft to generate a cone having the center of the gimbal as its apex. It will be seen that each point in the axis of the shaft E is thus caused to describe a circle which varies in size with its distance from the upper end of the shaft or center of the gimbal, and if the shaft is extended below the arms, as shown in Fig. 2, and attached to the arm of a crank mounted on a shaft the axis of which is coincident with the axis of the cone, the axis of the arm of the crank coinciding with the axis of the shaft E, the movement of the shaft would turn the crank and rotate its shaft. If an arm, substantially such as F, (shown in Figs. 1, 3, and 6,) is properly attached to the shaft E, it will be made to partake of a motion similar to the movement of E, and a crank coupled to such arm in substantially the same manner as before described for coupling a crank to the end of the shaft E, the arm F will turn such crank, and thereby rotate the shaft J, which is at an angle with the shaft G. I attach this arm to the shaft E in the manner shown in Figs. 1 and 3—that is to say, a bent shaft, H, is mounted in bearings which are mounted upon a frame upon each side of the gimbal. The axis of the gudgeons K K of the shaft H is at right angles to the axis of the shaft E and will intersect it at the center of the gimbal. The shaft H is bent downward to avoid the gimbal, and is attached to another shaft, I, which is at right angles to the axis of the gudgeons of the shaft H. The shaft I is pivoted at its ends in bearings attached to the arm F in such a manner that the axis of the shaft I will bisect the angle between the axes of the shaft E and arm F, and will pierce the center of the gimbal. This will allow a free motion of the arm and shaft, and will guide the arm in a proper and even motion. The movement of the shaft E as described will cause the axis of the arm to also generate a cone, and by coupling such arm with a crank, observing the rule given above for coupling the shaft E with a crank, the arm will be caused to turn the crank and impart motion to a shaft having its axis at right angles to the rotary shaft G, which imparts motion to the gimbal.

In the form of machine shown in Fig. 2, I employ a motion-transmitter, D, the principle of which is illustrated in Figs. 4 and 5.

The vibrations of the shaft E in the form of machine shown in Fig. 2 are different in its relation to the arms as they come into contact with the cogs from that of its vibrations in the form shown in Fig. 1—that is to say, while in Fig. 1 the shaft E swings away from the arm which is passing over a cog and swings toward the arms which are not in contact with the cogs, in Fig. 2 the shaft E swings toward the arm which passes over the cog and swings from the arm which is not in contact with the cog.

The extent of the vibrations or gyrations of the shaft E will depend upon the height of its point of suspension above the plane of the rack.

The motion-transmitter shown in Fig. 4 differs from that shown in Fig. 5 in the manner of construction, but not in principle. This principle is explained in my application for Letters Patent on "mechanical movement" filed by me in United States Patent Office on the 8th day of October, 1885, and is covered by the claims made in such application and allowed October 15, 1885, and I do not intend by illustrating this form of transmitter to dedicate the same to the public. The form shown in Fig. 4 will change the direction of rotation of the shafts to which the transmitter is connected, while the form shown in Fig. 5 will cause the two shafts to coincide with each other in the direction of their rotation.

The modifications which my invention may be made to undergo are numerous and obvious, and I do not wish to limit myself to the peculiar construction shown, but I claim, broadly, the invention of the gyratory shaft E in combination with the arms and circular rack in the manner set forth.

What I claim as new, and desire to secure by Letters Patent, is—

1. In a motion-transmitter, substantially such as described, the following elements in combination with each other: a shaft mounted upon its support by means of a gimbal-joint, arms extending radially therefrom, and a circular rack encircling such shaft, all being constructed and arranged substantially as set forth, whereby the axis of the shaft is caused to generate a cone when the shaft is revolved upon its axis, and whereby a rotary motion is given to each point in the axis of the shaft, as set forth.

2. The combination, in a motion-transmitter, of the shaft E, coupled by means of a gimbal with a rotary shaft, G, arms A A', &c., attached rigidly to and projecting radially from such shaft, a circular rack having cogs C C', &c., projecting therefrom perpendicular to the plane of the rack across the path in which the arms would move if they were to be rotated in a plane parallel with the plane of the rack, whereby the axis of the shaft E is caused to generate a cone, substantially as set forth, when G is rotated.

3. In a motion-transmitter, substantially such as described, and in combination with the cone-describing shaft E, and with the shafts H and I, substantially as set forth, an arm mounted upon such cone-describing shaft by means of bearings wherein the shaft may revolve, the axis of the arm is at right angles with the axis of the cone-describing shaft and intersects the same at the center of its suspension, the axis of the gudgeons of the shaft H is at right angles to the axis of the arm and intersects the same at its point of junction with the axis of the shaft E, the axis of the shaft I intersects the angle between the shaft E and arm F, whereby the arm F is caused to partake of the cone-describing motion of the shaft E and operate a crank, substantially as set forth.

4. In a motion-transmitter, the combination, substantially as set forth, of the shaft G, gimbal L M N, shaft E, arms A A', &c., friction-rollers B B', &c., and cogs C C', &c., whereby the rotation of the shaft D causes the shaft E to gyrate, as set forth.

SAMUEL DEVISME.

Witnesses:
 JAS. R. TOWNSEND.
 E. LECHLER.